US009319651B2

(12) United States Patent
Watanabe

(10) Patent No.: US 9,319,651 B2
(45) Date of Patent: Apr. 19, 2016

(54) IMAGE PROJECTION APPARATUS, IMAGE PROJECTION METHOD, AND STORAGE MEDIUM OF PROGRAM

(71) Applicant: Ayako Watanabe, Kanagawa (JP)

(72) Inventor: Ayako Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/737,328

(22) Filed: Jun. 11, 2015

(65) Prior Publication Data

US 2016/0007000 A1 Jan. 7, 2016

(30) Foreign Application Priority Data

Jul. 1, 2014 (JP) .................. 2014-135712

(51) Int. Cl.
*H04N 9/31* (2006.01)
*H04N 3/22* (2006.01)
(52) U.S. Cl.
CPC ........... *H04N 9/3188* (2013.01); *H04N 9/3185* (2013.01)
(58) Field of Classification Search
CPC ..... H04N 9/3185; H04N 9/3188; H04N 9/31; H04N 9/317; H04N 9/3176; H04N 5/74; G09G 5/377; G09G 5/38

USPC .......... 348/744–747, 806, 807; 345/629, 630, 345/634, 647, 671
IPC ........................................ H04N 3/22,9/31, 5/74
See application file for complete search history.

(56) References Cited

U.S. PATENT DOCUMENTS

2005/0179825 A1* 8/2005 Hicks ................... H04N 9/31
348/745

\* cited by examiner

*Primary Examiner* — Sherrie Hsia
(74) *Attorney, Agent, or Firm* — Harness, Dickey & Pierce, P.L.C.

(57) ABSTRACT

An image projection apparatus for generating a projection image based on image data input to the image projection apparatus and projecting the projection image onto a projection face includes a correction unit to correct the projection image, a synthesis image projection unit to superimpose a superimposition image on the projection image corrected by the correction unit to generate a synthesis image and project the synthesis image onto the projection face, and an image capturing unit to capture the synthesis image projected on the projection face. The synthesis image projection unit changes a display position of the superimposition image to fit the superimposition image within a display area of the synthesis image by referring an image of the synthesis image captured by the image capturing unit, and projects the synthesis image after changing the display position of the superimposition image.

7 Claims, 20 Drawing Sheets

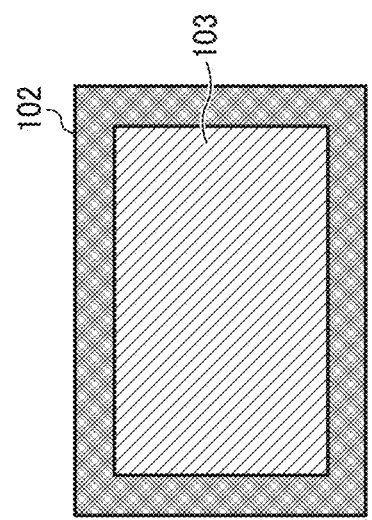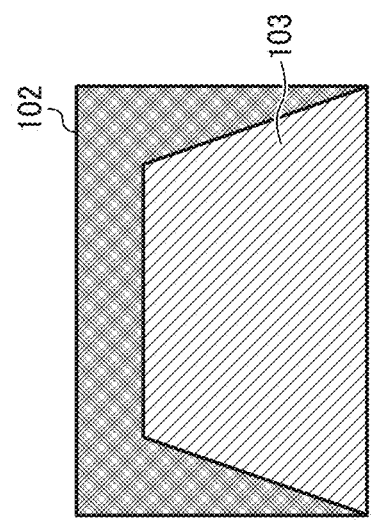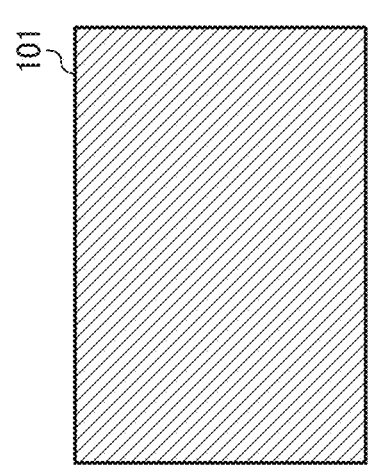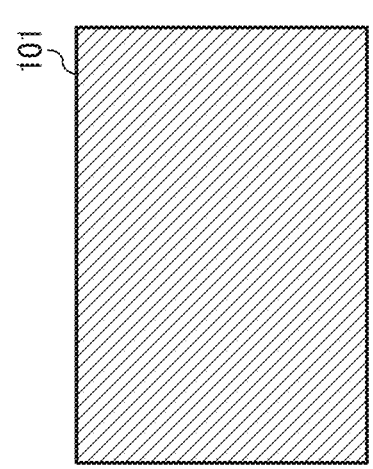
FIG. 20A
RELATED ART
FIG. 20B
RELATED ART

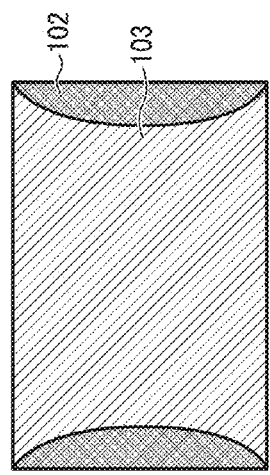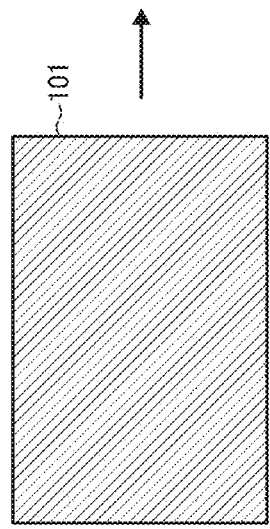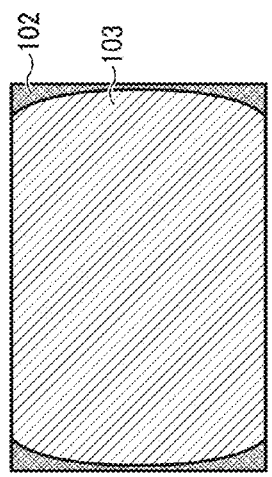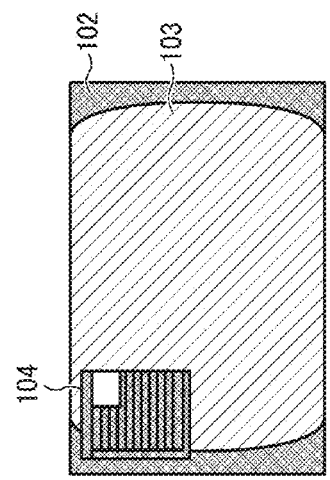
FIG. 22A RELATED ART
FIG. 22B RELATED ART
FIG. 23 RELATED ART

IMAGE PROJECTION APPARATUS, IMAGE PROJECTION METHOD, AND STORAGE MEDIUM OF PROGRAM

CROSS-REFERENCE TO RELATED APPLICATION

This application claims priority pursuant to 35 U.S.C. §119(a) to Japanese Patent Application No. 2014-135712, filed on Jul. 1, 2014 in the Japan Patent Office, the disclosure of which are incorporated by reference herein in their entirety.

BACKGROUND

1. Technical Field

The present invention relates to an image projection apparatus, an image projection method, and a storage medium of a program of the image projection method, and more particularly to an image projection apparatus having an on-screen display capability.

2. Background Art

Image projection apparatuses known as projectors employing liquid crystal panels having improved resolution and light sources (e.g., lamps) having improved luminance are available with less expensive cost. For example, small and light-weight image projection apparatuses employing a digital micro-mirror device (DMD) are available. These image projection apparatuses are used in offices, schools, homes or the like.

The image projection apparatus can be connected with an image data providing apparatus such as a personal computer (PC). An image input to the image projection apparatus from the PC can be projected on a projection face such as a screen. Further, the image projection apparatus includes an on-screen display (OSD) capability that can superimpose a menu image on a projected image, wherein the menu image can be used to instruct various operations and settings to the image projection apparatus.

The menu image generated by the OSD capability can be used to set various settings such as language selection, display modes, image adjustment, and power source status. A user can request desired operations using the menu image. Further, a dialogue image and an error display image can be generated by the OSD capability. Hereinafter, the menu image, dialogue image, and error display image generate-able by the OSD capability may be referred to as an OSD image, an OSD, or a superimposition image.

Further, the image projection apparatus can include an image correction capability to correct input image signals or data before projecting images. FIGS. 20A and 20B are examples of image corrections performable by the image projection apparatus.

As illustrated in FIG. 20, an image correction can be performed to an input image 101. FIG. 20A is an example of zooming (e.g., reduction) for the input image 101, and FIG. 20B is an example of a trapezoid correction for the input image 101, in which an image display area (display area 103) for displaying an image is corrected for an entire projection image (entire area 102), and a partial area of the entire area 102 not used for the display area 103 is projected as a black area.

When the image correction is performed to change the image display area, display positions of an OSD image 104 can be fit within the corrected display area 103 as illustrated in FIGS. 21A, 21B, and 21C.

However, when a short-range focusing projector that projects images from a position close to a screen is used to project an image, tiny dents such convex and concave on the screen surface may cause a greater distortion. In this case, conventional correction methods that correct a trapezoid distortion of the entire image may not effectively correct the distortion.

In this case, a barrel correction can be performed to the input image 101 as illustrated in FIG. 22. The barrel correction means a correction of distortion in (−) direction known as pincushion distortion, and a correction of distortion in (+) direction known as barrel distortion as illustrated in FIG. 22. When the barrel correction is performed by conventional projectors, it is difficult to fit the OSD image 104 within the display area 103 of a corrected projection image. For example, as illustrated in FIG. 23, the OSD image 104 does it within the display area 103 but protrudes outside the display area 103.

SUMMARY

In one aspect of the present invention, an image projection apparatus for generating a projection image based on image data input to the image projection apparatus and projecting the projection image onto a projection face is devised. The image projection apparatus includes a correction unit to correct the projection image, a synthesis image projection unit to superimpose a superimposition image on the projection image corrected by the correction unit to generate a synthesis image and project the synthesis image onto the projection face, and an image capturing unit to capture the synthesis image projected on the projection face. The synthesis image projection unit changes a display position of the superimposition image to fit the superimposition image within a display area of the synthesis image by referring an image of the synthesis image captured by the image capturing unit, and projects the synthesis image after changing the display position of the superimposition image.

In another aspect of the present invention, a method of projecting an image by generating a projection image based on image data input to an image projection apparatus and projecting the projection image onto a projection face by the image projection apparatus is devised. The method includes the steps of correcting the projection image when a distortion occurs to the projection image, superimposing a superimposition image on the projection image corrected at the correcting step to generate a synthesis image, projecting the synthesis image on the projection face, capturing the synthesis image projected on the projection face, changing a display position of the superimposition image to fit the superimposition image within a display area of the synthesis image by referring an image of the synthesis image captured at the capturing step, and projecting the synthesis image at the display position changed at the changing step.

In another aspect of the present invention, a non-transitory storage medium storing a program that, when executed by a computer, causes the computer to execute a method of projecting an image by generating a projection image based on image data input to an image projection apparatus and projecting the projection image onto a projection face by the image projection apparatus is devised. The method includes the steps of correcting the projection image when a distortion occurs to the projection image, superimposing a superimposition image on the projection image corrected at the correcting step to generate a synthesis image, projecting the synthesis image on the projection face, capturing the synthesis image projected on the projection face, changing a display position of the superimposition image to fit the superimposition image within a display area of the synthesis image by referring an image of the synthesis image captured at the capturing step, and projecting the synthesis image at the display position changed at the changing step.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 20A is an example of an image correction (reduction) by conventional image projection apparatuses;

FIG. 20B is an example of an image correction (trapezoid correction) by conventional image projection apparatuses;

FIG. 22A, and 22B are examples of barrel correction performed to an input image by conventional image projection apparatuses; and FIG. 23 is an example of an OSD image not fitting within a display area when a barrel correction is performed by conventional image projection apparatuses.

Figure 1:
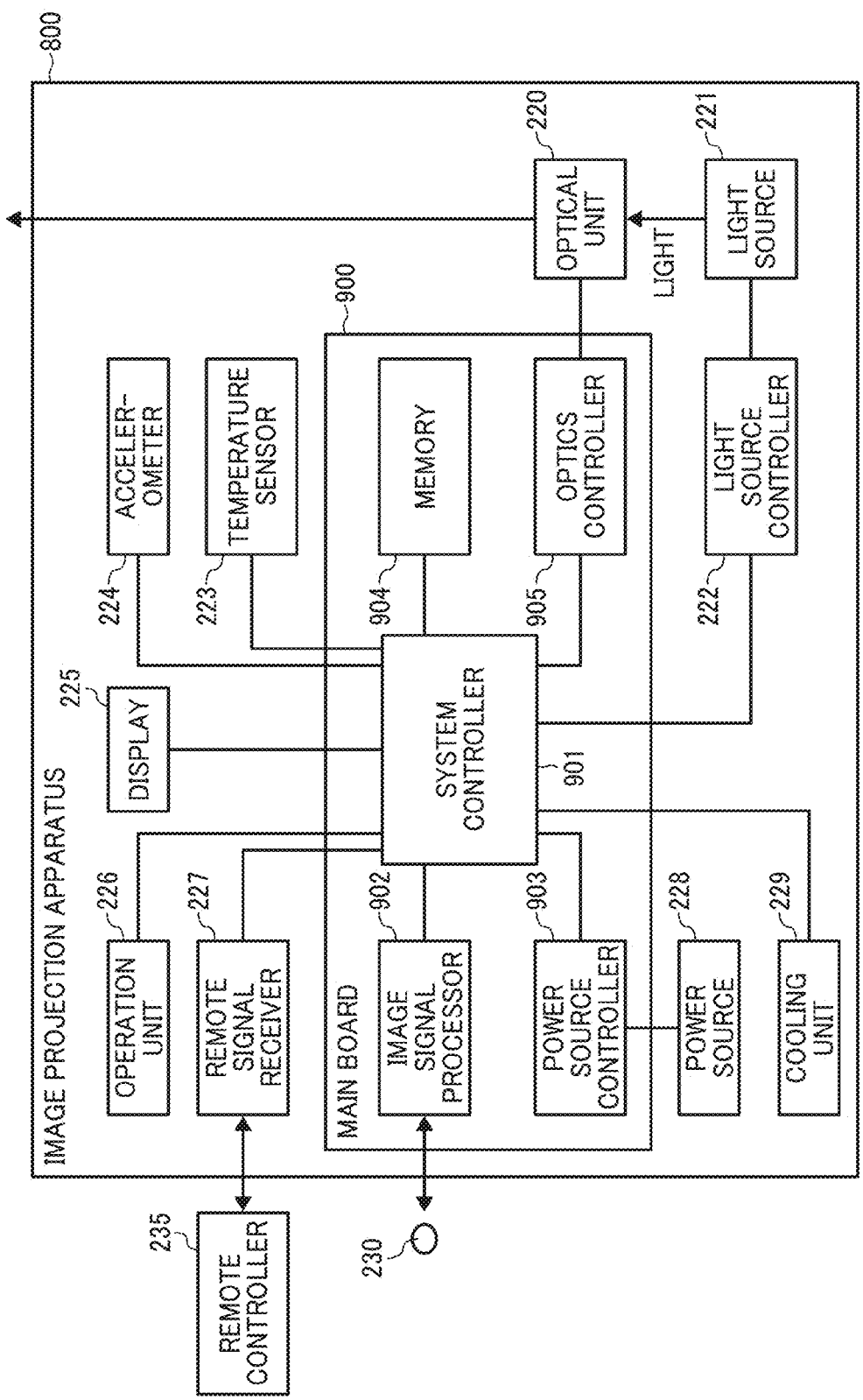
FIG. 1 is a block diagram of a configuration of an image projection apparatus

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more example embodiments are described hereinafter.

A description is given of one or more example embodiments of the present invention with reference to FIGS. 1 to 19.

Configuration of Image Projection Apparatus

A description is given of a configuration of an image projection apparatus of one or more example embodiments of the present invention. FIG. 1 is a block diagram of a configuration of an image projection apparatus 800 useable as a projector. The image projection apparatus 800 includes, for example, a main board 900, an optical unit 220, and a light source 221. The image projection apparatus 800 does not have capability of barrel correction.

The main board 900 is a printed circuit board that controls the image projection apparatus 800 as a whole. The main board 900 includes, for example, a system controller 901, an image signal processor 902, a power source controller 903, a memory 904, and an optics controller 905, which can be devised by employing an integrated circuit such as application specific integrated circuit (ASIC) or the like.

The system controller 901 controls the image projection apparatus 800 as a whole. Further, the system controller 901 performs projection control, image correction, addition of OSD image or the like. The system controller 901 can be connected to the image signal processor 902, the power source controller 903, the memory 904, and the optics controller 905 via a bus to control these units.

The image signal processor 902 processes image signals or data that can be supplied from an external image data providing apparatus. The image signal processor 902 receives various image signals or data managed by the main board 900 for each type of input data (computer, Y/Pb/Pr, high-definition multimedia interface (HDMI: registered trademark), video) via an image signal input interface 230 (computer, HDMI, video), and performs various processing to the image signals or data such as serial-parallel conversion and voltage level conversion.

The power source controller 903 controls a power source 228 that supplies power to the image projection apparatus 800. The power source controller 903 controls of ON/OFF of the power source 228 under the control of the system controller 901.

The memory 904 is a non-volatile memory that stores various data process-able by the system controller 901. The memory 904 can employ various non-volatile semiconductor memories such as erasable programmable read only memory (EPROM), electrically erasable programmable read only memory (EEPROM), flash memory or the like.

The optics controller 905 controls the optical unit 220 that generates images such as still image and movie image. The optics controller 905 supplies image data generated by the system controller 901 to the optical unit 220 to generate images corresponding to the image data.

The optical unit 220 generates the images corresponding to the image data, and projects the images onto a projection face by irradiating light emitted by the light source 221 to the optical unit 220. When the image projection apparatus 800 is a liquid crystal projector, the optical unit 220 can employ liquid crystal. Further, when the image projection apparatus 800 is a projector employing digital light processing (DLP: registered trademark), the optical unit 220 can employ a DMD and a color wheel.

A light source controller 222 controls the light source 221 to adjust light intensity or quantity of the light source 221 under the control of the system controller 901. The light source 221 can employ a high pressure mercury (vapor) lamp or the like.

Further, the image projection apparatus 800 further includes, for example, a temperature sensor 223, an accelerometer 224, a display 225, an operation unit 226 (e.g., keys disposed on the apparatus), a remote signal receiver 227, and a cooling unit 229, which can be connected with the system controller 901 via a bus.

The temperature sensor 223 detects temperature in the image projection apparatus 800. The temperature sensor 223 reports the detected temperature to the system controller 901.

The accelerometer 224 detects acceleration occurred to the image projection apparatus 800. The accelerometer 224 reports the detected acceleration to the system controller 901. The accelerometer 224 can be used as a motion detector of the image projection apparatus 800.

The display 225 includes, for example, light emitting diode (LED) indicators and a liquid crystal panel to report or notify various information to users. The display 225 displays information received from the system controller 901 on the LED indicators and/or liquid crystal panel.

The operation unit 226 is, for example, disposed on an outer casing of the image projection apparatus 800 to receive various operational requests from users. The operational requests include, for example, an instruction of displaying an OSD image such as a menu image, a request of changing an aspect ratio of a being-projected image, a request of power-OFF of the image projection apparatus 800, a request of changing light power of the light source 221, a request of switching an image data providing apparatuses when a plurality of image data providing apparatuses are connected to switch an input source of a projection image, a request of changing an image mode for changing image quality of a being-projected image (high luminance, normal luminance, natural luminance), a request of freezing or stopping of projecting an image, a request of switching types of port for acquiring data of a projection image, a request of displaying a main menu image or a sub-menu image, and a request of changing an aspect ratio, and a request of closing a sub-menu image. Upon receiving any one of the operational requests, the operation unit 226 reports the operational request to the system controller 901.

The remote signal receiver 227 receives the operational requests as operational signals from a remote controller 235 used as a remote control apparatus. Upon receiving the operational signals, the remote signal receiver 227 reports the operational signals to the system controller 901.

The cooling unit 229 is configured with, for example, a cooling fan driven by the system controller 901 to cool the image projection apparatus 800. The cooling unit 229 can cool the image projection apparatus 800 under the control of the system controller 901.

Figure 2:
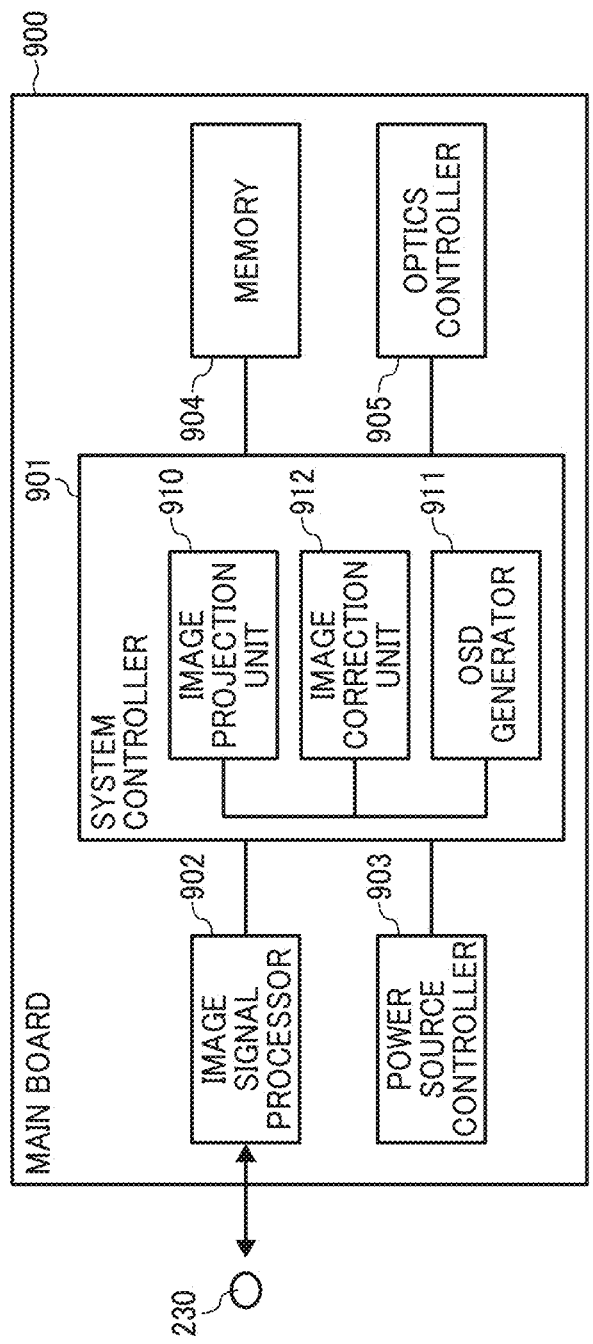
FIG. 2 is a block diagram of a main board of the image projection apparatus of FIG. 1.

FIG. 2 is a block diagram of the main board 900 of the image projection apparatus 800.

The system controller 901 includes, for example, an image projection unit 910, an image correction unit 912, and an OSD generator 911.

The image projection unit 910 controls the optics controller 905 to project images corresponding to image data. The image projection unit 910 transmits image signal or data received from the image data providing apparatus used for generating an image, and/or image signal or data acquired from the OSD generator 911 used for generating a menu image to the optics controller 905, and projects these image data by using the optics controller 905.

The image correction unit 912 performs various image corrections such as zooming (enlargement/reduction), trapezoid correction, and aspect ratio change.

The OSD generator 911 of the main board 900 generates an OSD image such as a menu image, a dialogue image, a message window, icons, and help. For example, the OSD generator 911 reads menu setting information to be displayed as a main menu image from the memory 904, and generates the main menu image based on the menu setting information. The OSD generator 911 transmits the main menu image to the image projection unit 910.

Further, the system controller 901 performs changing or switching of input information, activation, and OSD display instruction.

Figure 3:
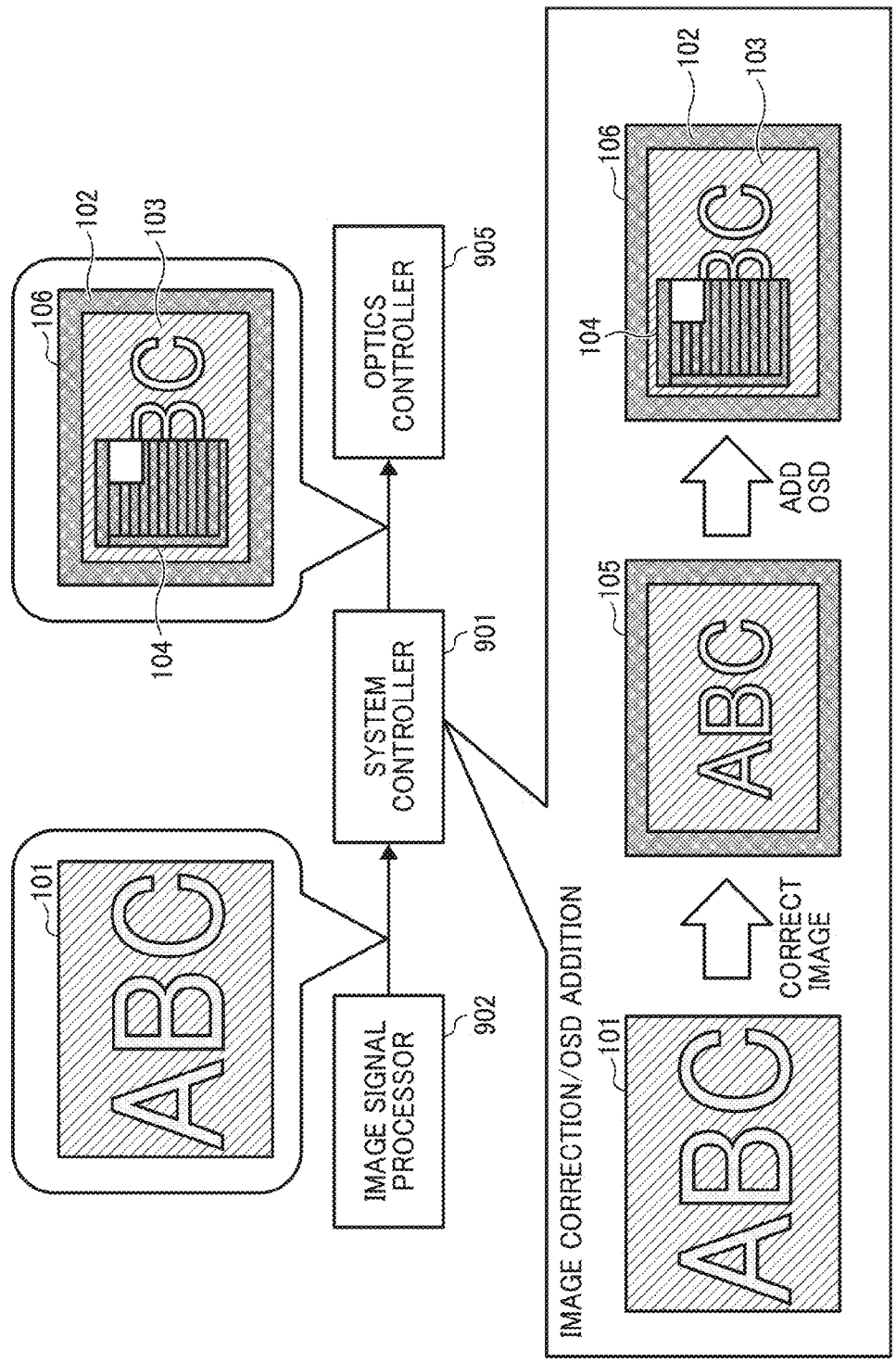
FIG. 3 is a schematic flow of image processing by the image projection apparatus of FIG. 1.

FIG. 3 is a schematic flow of image processing by the image projection apparatus 800. In this example case, an input image 101, input to the system controller 901 from the image signal processor 902, is corrected by the image correction unit 912 based on user settings such as reduction as an corrected image 105, and then the corrected image 105 is added with an OSD image 104 (superimposition image) by the OSD generator 911 to generate an projection image 106, in which the OSD image 104 is used as a superimposition image superimposed on the corrected image 105, and the corrected image 105 superimposed with the OSD image 104 becomes the projection image 106 referred to as a synthesis image.

For example, if the resolution or pixel numbers of the image projection apparatus 800 is 1280×800 pixels, the system controller 901 processes image data as an image of 1280× 800 pixels. This size corresponds to the size of the entire area 102 but does not correspond the size of the display area 103. The size of the display area 103 may vary depending on image correction methods. Further, since the OSD image 104 is placed to fit within the display area 103, coordinates of a display position of OSD image 104 is calculated when the image correction is performed.

Figure 4:
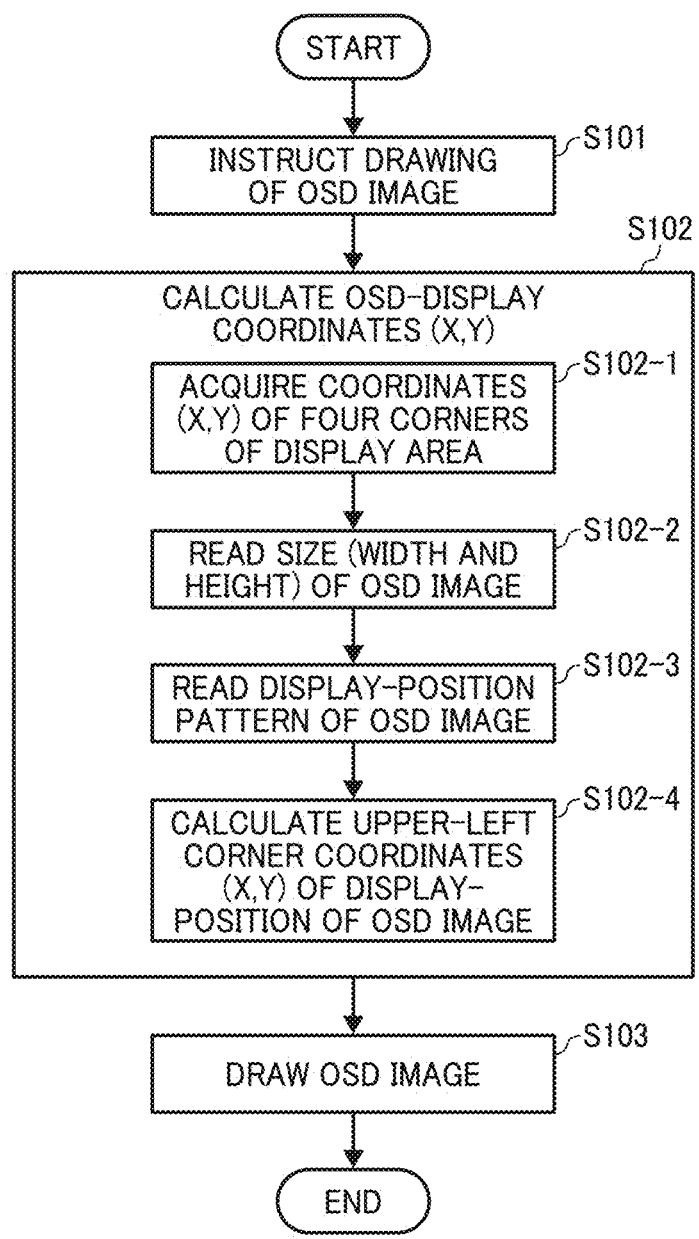
FIG. 4 is a flowchart showing the steps of calculating coordinates of OSD image by the image projection apparatus of FIG. 1.

FIG. 4 is a flowchart showing the steps of calculating coordinates of a display position of the OSD image 104 by the image projection apparatus 800. In this example case, after the image correction unit 912 performs a reduction correction, the OSD image 104 generated by the OSD generator 911 is displayed on the display area 103.

Upon receiving an instruction to draw the OSD image 104 (S101), the system controller 901 calculates coordinates (x, y) of a display position of the OSD image 104 (S102), and then draws the OSD image 104 (S103).

When calculating the coordinates (x, y) of the display position of the OSD image 104 (S102), the system controller 901 acquires coordinates (x, y) of four corners of the display area 103 (S102-1), in which the coordinates (x, y) of the four corners can be acquired from the image correction unit 912.

Figure 5:
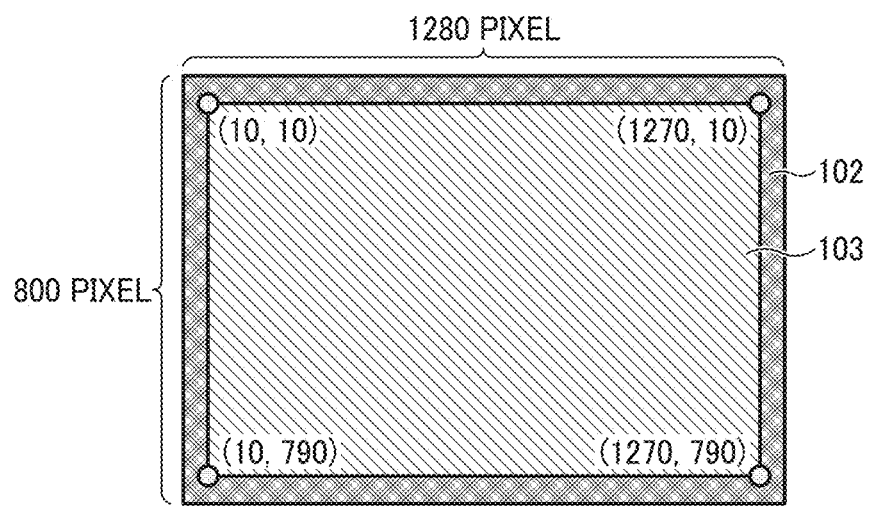
FIG. 5 is an example of coordinates (x, y) of four corners of a display area.

FIG. 5 is an example of the coordinates (x, y) of the four corners of the display area 103 when calculating the coordinates (x, y) of the display position of the OSD image 104. When the entire area 102 has a size of 1280×800 (pixels), the coordinates of the four corners of the display area 103 has, for example, the upper-left coordinates (10, 10), the upper-right coordinates (1270, 10), the bottom-left coordinates (10, 790), and the bottom-right coordinates (1270, 790).

Then, the system controller 901 reads a size (e.g., width and height) of the OSD image 104, which is a to-be-displayed image (S102-2). The size information of the OSD image 104 can be retained in the memory 904 in advance. For example, the OSD image 104 has 100 pixels for the width and 200 pixels for the height (100×200 pixels).

Further, a plurality of display position patterns can be pre-set for the OSD image 104. The system controller 901 reads a display position pattern of the OSD image 104 (S102-3), in which information of the display position patterns of the OSD image 104 can be retained in the memory 904 in advance.

Figure 6:
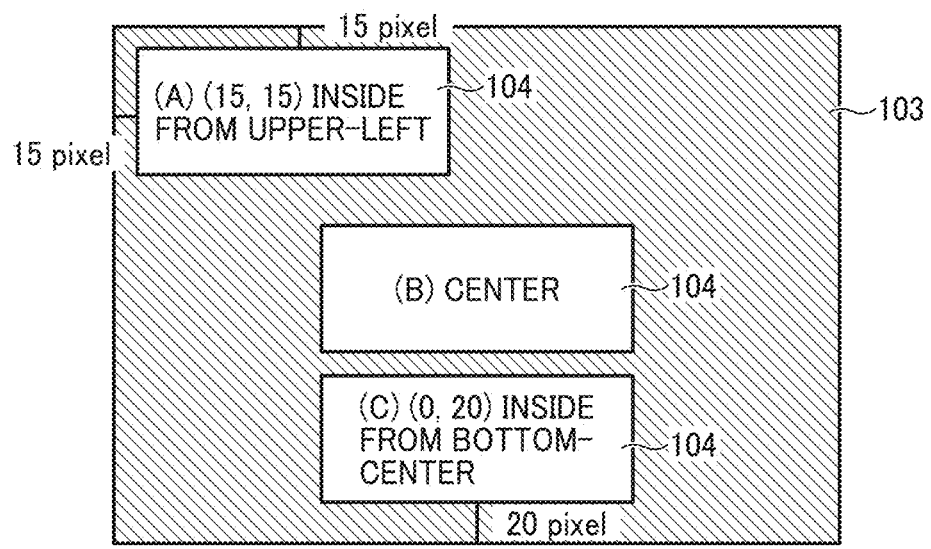
FIG. 6 is examples of display position patterns of OSD images.

FIG. 6 illustrates examples of display position patterns of the OSD image 104. The display position patterns of the OSD image 104 is, for example, (a) inside from the upper-left corner of the display area 103 by (15, 15), (b) the center of the display area 103, and (c) inside from the bottom-center of the display area 103 by (0, 20) as illustrated in FIG. 6.

Figure 7:
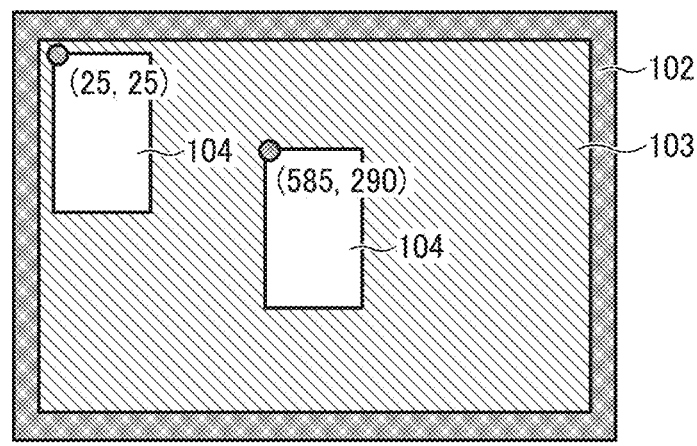
FIG. 7 is examples of display positions of OSD image set by calculating upper-left corner coordinates (x, y) of OSD image.

Then, a upper-left corner coordinates (x, y) of the OSD image 104, to be displayed, can be calculated based on the display position pattern read from memory 904 for the OSD image 104 (S102-4). FIG. 7 illustrates examples of display positions of the OSD image 104 set by calculating the upper-left corner coordinates (x, y) of the OSD image 104.

For example, if the display position pattern applied to the OSD image 104 is (a) inside from the upper-left corner of the display area 103 by (15, 15) pixels, coordinates of the OSD image 104 can be calculated as below.

Upper-left corner coordinate (x) of OSD image = upper-left corner coordinate (x) of display area + 15 = 10 + 15 = 25

Upper-left corner coordinate (y) of OSD image = upper-left corner coordinate (y) of display area + 15 = 10 + 15 = 25

Further, if the display position pattern applied to the OSD image 104 is (b) the center of the display area 103, coordinates of the OSD image 104 can be calculated as below.

Upper-left corner coordinate (x) of OSD image =

(upper-left corner coordinate (x) of display area − OSD width)/2 =

(1270 − 100)/2 = 585

Upper-left corner coordinate (y) of OSD image =

(lower-left corner coordinate (y) of display area − upper-left corner coordinate (y) of display area − OSD height)/

2 = (790 − 10 − 200)/2 = 290

As above described, the calculation of the coordinates (x, y) of the display position of the OSD image 104 requires information of (1) the coordinates of the four corners of the display area 103, (2) the size (width, height) of the OSD image 104, and (3) the display position pattern of the OSD image 104.

Barrel Correction Capability

Figure 8:
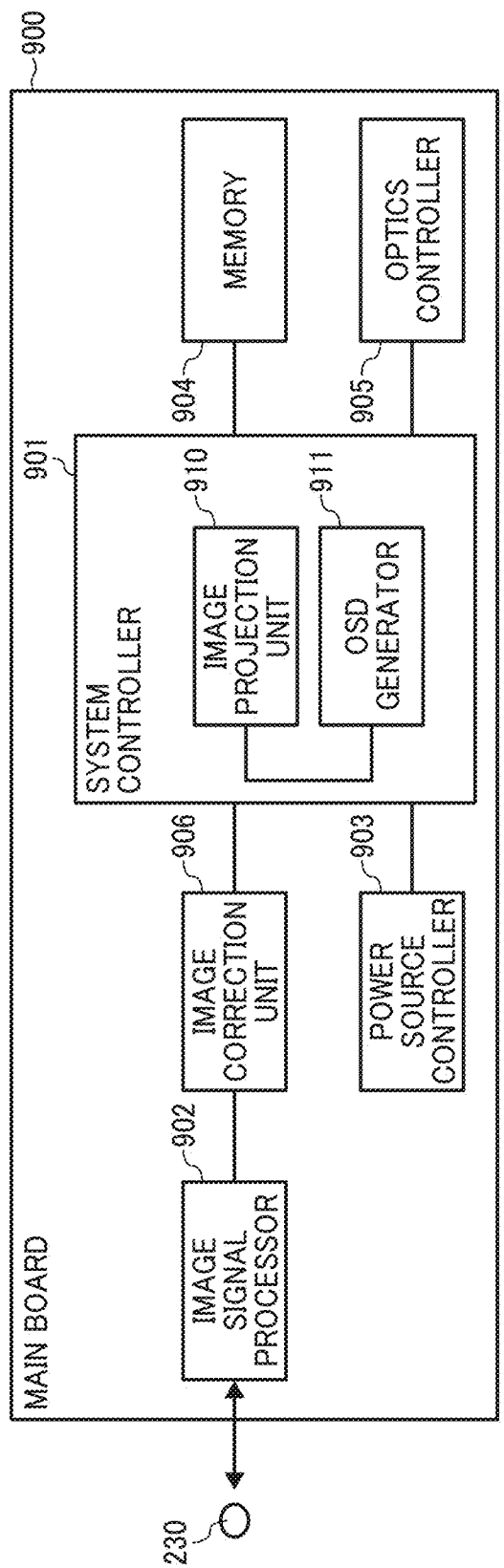
FIG. 8 is a block diagram of a main board of an image projection apparatus having barrel correction capability.

A description is given of another image projection apparatus having barrel correction capability. FIG. 8 is a block diagram of a main board 900 of an image projection apparatus 100 (FIGS. 10, 11) having the barrel correction capability.

The image correction unit 912 of the system controller 901 of the above described image projection apparatus 800 (FIG. 1) has no barrel correction capability because a hardware configuration for the barrel correction capability is not disposed for the image projection apparatus 800. To perform the barrel correction, the image projection apparatus 100 of FIG. 8 includes an image correction unit 906 disposed before the system controller 901 so that the image correction unit 906 can perform the barrel correction as an image correction process.

As to the image projection apparatus 800 of FIG. 1, the image correction unit 912 in the system controller 901 of the main board 900 can perform various image correction processes such as zooming (enlargement/reduction), trapezoid correction, and aspect ratio change, but does not have the barrel correction capability. By contrast, as to the image projection apparatus 100 of FIG. 8, the image correction unit 906 disposed before the system controller 901 in the main board 900 can perform various image corrections processes such as zooming (enlargement/reduction), trapezoid correction, aspect ratio change, and also the barrel correction.

Figure 9:
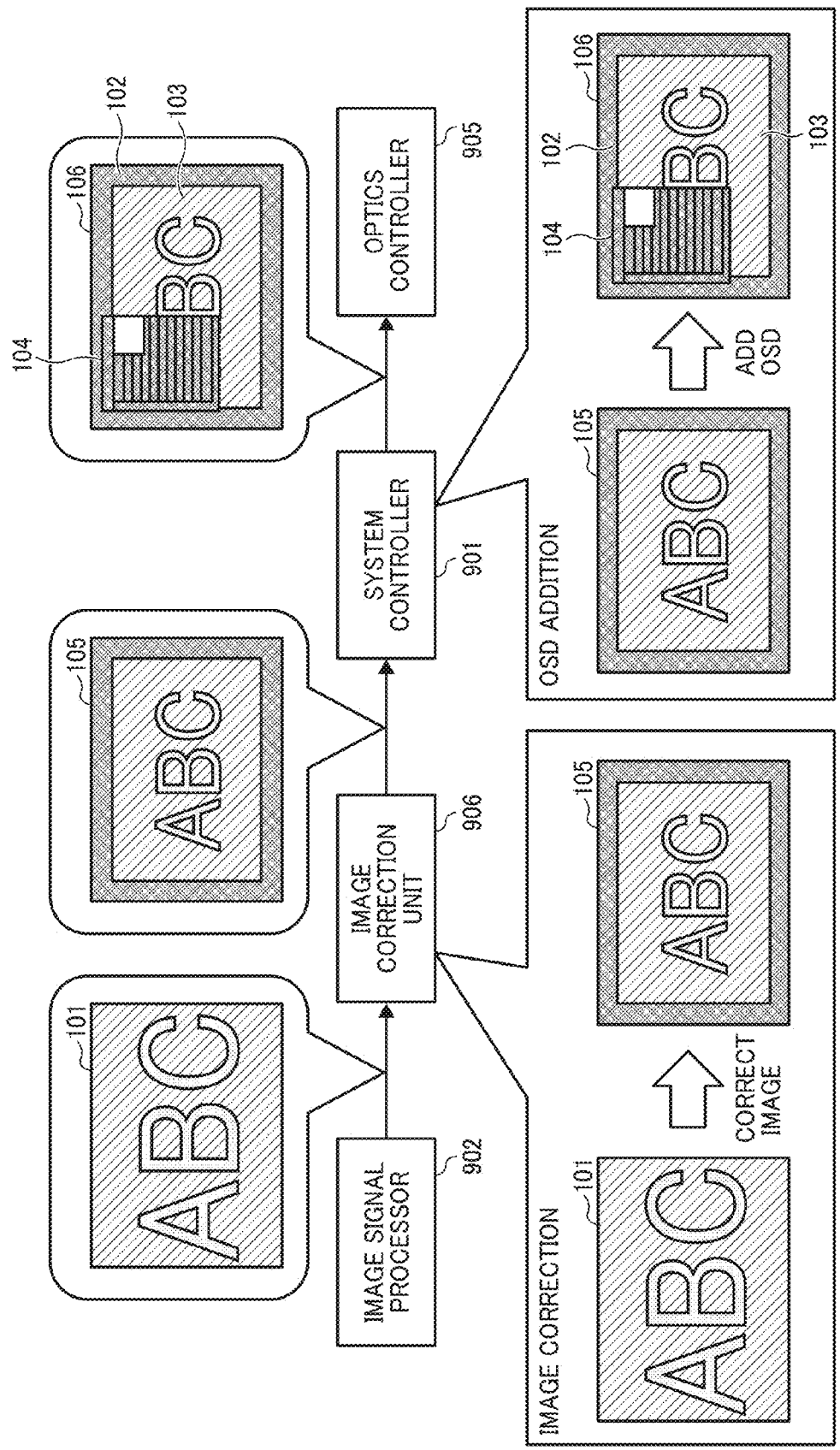
FIG. 9 is a schematic flow of image processing by the image projection apparatus of FIG. 8 having the barrel correction capability.

FIG. 9 is a schematic flow of image processing by the image projection apparatus 100 having the barrel correction capability.

As to the image projection apparatus 100, the image correction unit 906 corrects the input image 101 as the corrected image 105, and the OSD generator 911 of the system controller 901 adds or superimposes the OSD image 104 to the corrected image 105 to generate the projection image 106 used as a synthesis image. In this configuration, the corrected image 105 is transferred from the image correction unit 906 to the system controller 901, in which image data can be transferred via the memory 904.

As to the image projection apparatus 100, coordinates information of the display area 103 cannot be used for calculating coordinates of a display position of the OSD image 104. Specifically, the image correction unit 906, which can perform the image correction, can retain the coordinate information of the display area 103, but the image projection apparatus 100 is not provided with a hardware configuration to transfer the coordinate information of the display area 103 from the image correction unit 906 to the system controller 901.

Therefore, the OSD generator 911 of the system controller 901, which is used to add or superimpose the OSD image 104, cannot use coordinates information of the display area 103 to calculate the coordinates of display position of the OSD image 104 required for displaying the OSD image 104. If the system controller 901 calculates the coordinates of the display position of the OSD image 104 based on coordinates of the four corners of the entire area 102, which are known information, instead of the coordinates of the display area 103, the OSD image 104 may be displayed at a position protruded from the display area 103 as illustrated in FIGS. 9 and 23. FIGS. 9 and 23 illustrate examples of OSD images by applying a display position pattern displayable at the upper-left of the display area 103.

Figure 10A:
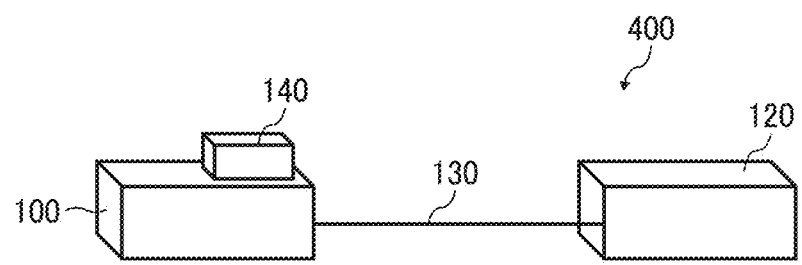
FIG. 10A is a schematic configuration of an image projection system.
Figure 10B:
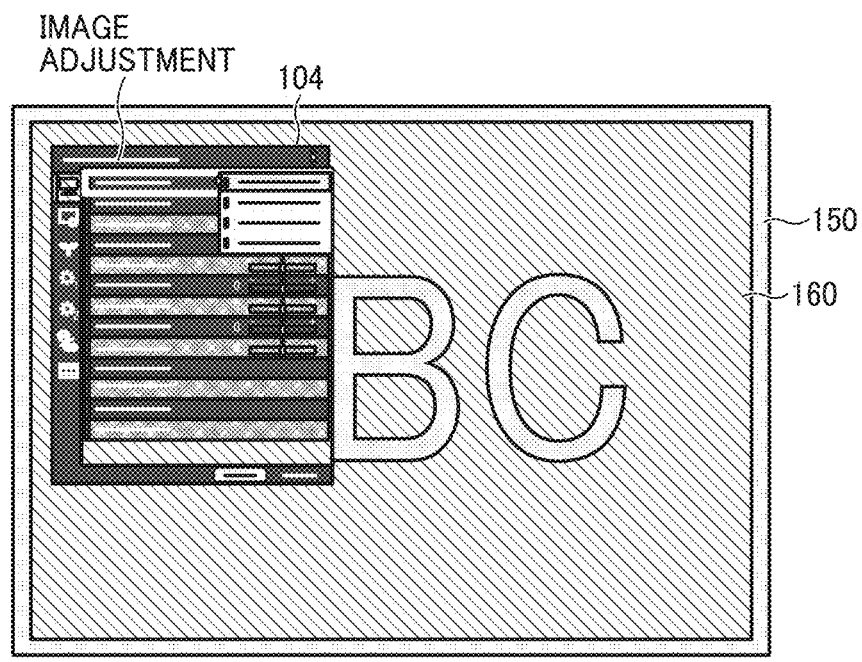
FIG. 10B is an example of a projection image projected on a projection face by the image projection system of FIG. 10A.

The image projection apparatus 100 can generate a projection image (projection image 160 in FIG. 10B) based on image signal or data, and project the projection image on a projection face such as a screen (screen 150 in FIG. 10B). The image projection apparatus 100 includes, for example, a correction unit (image correction unit 206) to correct an input image (input image 101), a synthesis image projection unit (main controller 300, OSD generator 301, image projection unit 303, and OSD-position determination unit 305 of the system controller 201) to superimpose a superimposition image (OSD image 104) on a corrected image (corrected image 105) corrected by the correction unit as a synthesis image (projection image 106) and projects the synthesis image, and an capturing unit (image capturing unit 140, and image capturing control unit 304) to capture the synthesis image projected on the projection face. With this configuration, the synthesis image projection unit can change a display position of the superimposition image in the synthesis image by referring an image captured by the capturing unit to fit the superimposition image within the display area (display area 103) when projecting the synthesis image.

Configuration of Image Projection System

A description is given of an image projection system 400 employing the image projection apparatus 100. FIG. 10A is a schematic configuration of the image projection system 400. The image projection system 400 includes, for example, the image projection apparatus 100 such as a projector, and an image providing apparatus 120 connectable with each other by using a cable 130.

Further, the image projection apparatus 100 can project the projection image 160 onto the projection face 150 as illustrated in FIG. 10B. Further, the OSD image 104 such as a menu image can be projected and superimposed on the projection image 160.

The image projection apparatus 100 is an example of an image output apparatus that can project images supplied from the image providing apparatus 120 onto the projection face such as the screen 150. The image projection apparatus 100 can project the images supplied from the image providing apparatus 120 by adding or superimposing an OSD image (superimposition image) such as a menu image, wherein a user can set various instructions by using the OSD image such as a menu image. Further, the OSD image can be projected even when images are not supplied from the image providing apparatus 120.

The image projection apparatus 100 includes, for example, an image capturing unit 140 (e.g., camera) to capture the projection image 160. The image capturing unit 140 can be disposed in the image projection apparatus 100, or can be an external unit connectable to the image projection apparatus 100.

The image projection apparatus 100 includes an interface such as video input terminals to receive image signals or data. The video input terminals include, for example, video graphics array (VGA) input terminal of D-Sub connector, high-definition multimedia interface (HDMI: registered trademark) terminal, S-VIDEO terminal, and RCA terminal. The image projection apparatus 100 can receive image signals or data from the image providing apparatus 120 via the cable 130 connected to these terminal.

Further, the image projection apparatus 100 can receive image signals or data from the image providing apparatus 120 by wireless communication using wireless communication protocol such as Bluetooth (registered trademark) and WiFi (registered trademark).

The image providing apparatus 120 can supply image data to the image projection apparatus 100. The image providing apparatus 120 includes an interface to output image signals or data. The image providing apparatus 120 transmits image signals or data of to-be-displayed images to the image projection apparatus 100 with a transfer rate such as 30 fps (frame per second) to 60 fps.

The image providing apparatus 120 includes an interface such as video output terminals for outputting image signals or data. The video output terminals include, for example, VGA output terminal, HDMI terminal, S-VIDEO terminal, and RCA terminal. The image providing apparatus 120 can transmit image signals or data to the image projection apparatus 100 via the cable 130 connected to these terminals. Further, the image providing apparatus 120 can transmit image signals or data to the image projection apparatus 100 using wireless communication.

The image providing apparatus 120 is an example of an information processing apparatus such as a notebook personal computer (PC), a desktop PC, a tablet PC, and a portable digital assistant (PDA) that can supply image signals or data. In a case of FIG. 10A, the image projection apparatus 100 is connected to one image providing apparatus 120, but the image projection apparatus 100 can be connected to two or more image supply apparatuses 120.

Configuration of Image Projection Apparatus

Figure 11:
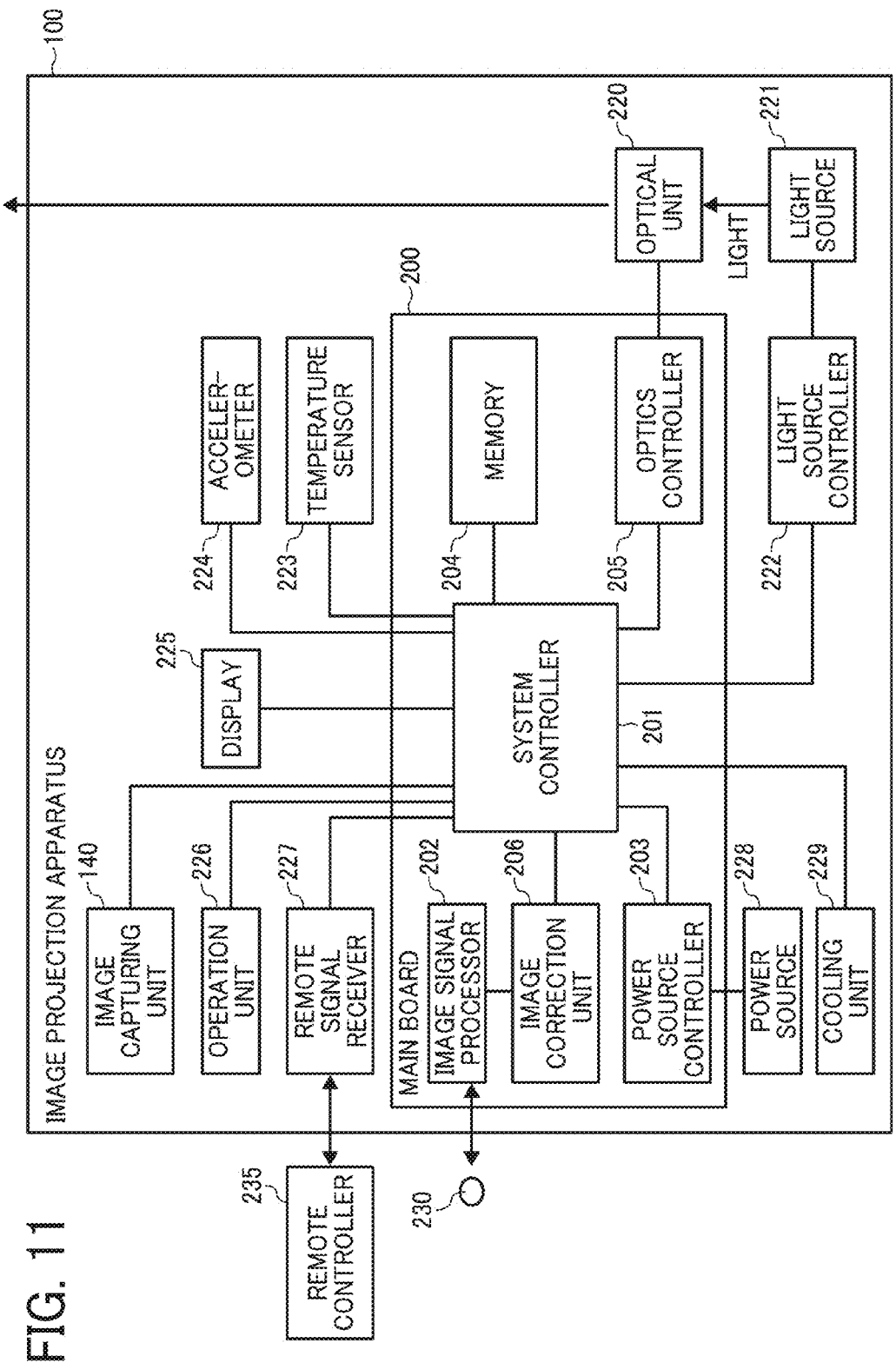
FIG. 11 is a block diagram of a configuration of an image projection apparatus employed for the image projection system of FIG. 10.

FIG. 11 is a block diagram of a configuration of the image projection apparatus 100. The configuration of image projection apparatus 100 is described for parts or units different from the configuration of the image projection apparatus 800, and the descriptions of the same parts or units is omitted.

The system controller 201 controls the image projection apparatus 100 as a whole, a projection control, and an addition of OSD image. Further, the image correction unit 206 disposed before the system controller 201 can perform the image correction. For example, the image correction unit 206 can perform various image correction process such as zooming (enlargement/reduction), trapezoid correction, aspect ratio change, and distortion correction such as barrel correction.

The image signal processor 902, the power source controller 203, the memory 204, and the optics controller 205 respectively have the same capability of the image signal processor 902, the power source controller 903, the memory 904, and the optics controller 905.

Further, the image capturing unit 140 such as a camera can capture the projection image 160. For example, the image capturing unit 140 can be disposed at a front face of the image projection apparatus 100 to capture images of objects or the like ahead of the image projection apparatus 100. The image capturing unit 140 transmits captured images to the system controller 201. The field of angle of the image capturing unit 140 can be adjusted to an angle that can capture the entire of the projection image 160.

Figure 12:
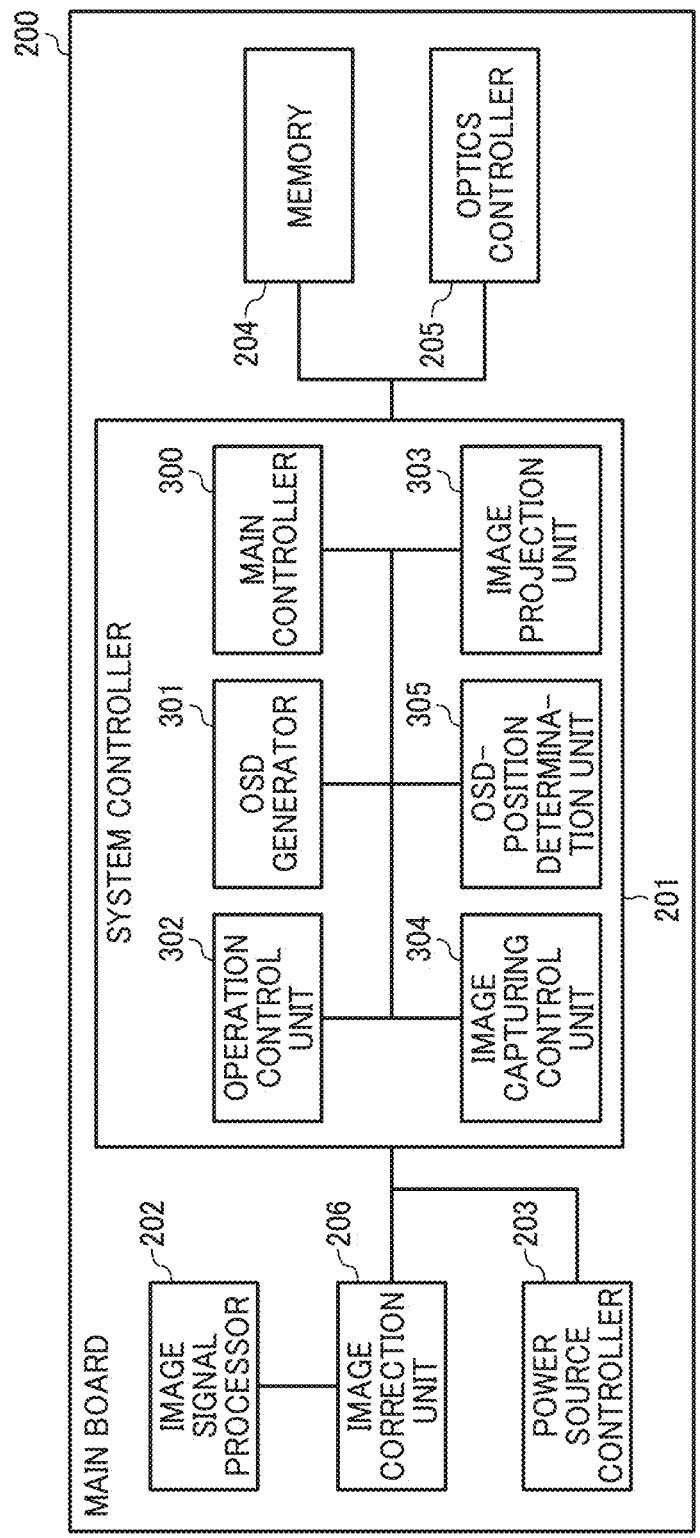
FIG. 12 is a block diagram of a configuration of a main board of the image projection apparatus of FIG. 11.

FIG. 12 is a block diagram of a configuration of a main board 200 of the image projection apparatus 100.

The system controller 201 includes, for example, a main controller 300, an OSD generator 301, an operation control unit 302, an image projection unit 303, an image capturing control unit 304, and an OSD-position determination unit 305.

The main controller 300 controls each unit of the system controller 201. The main controller 300 performs changing or switching of input information, activation, and OSD display instruction.

The OSD generator 301 of the main board 200 generates an OSD image such as a menu image, a dialogue image, a message window, icons, and help.

The operation control unit 302 receives various operational requests from the operation unit 226 and the remote controller 235, and reports the received operational requests to the system controller 201.

The image capturing control unit 304 controls the image capturing unit 140 to capture the projection image 160 projected on the projection face 150.

The OSD-position determination unit 305 determines whether the OSD image 104 protrudes from the display area 103 in an image captured by the image capturing unit 140, and calculates coordinates of a display position of the OSD image 104.

The image projection unit 303 controls the optics controller 205 to project images corresponding to image data. Specifically, the image projection unit 303 transmits image signal or data received from the image providing apparatus 120 used for generating an image, and/or image signal or data acquired from the OSD generator 301 used for generating a menu image to the optics controller 205, and projects these image data by using the optics controller 205.

The main controller 300, the OSD generator 301, the image projection unit 303, and the OSD-position determination unit 305 can be collectively used as the synthesis image projection unit that superimposes the OSD image 104 on an image generated from the image signal or data, and projects the superimposed image as a synthesis image.

OSD Displaying Process (1)

Figure 13:
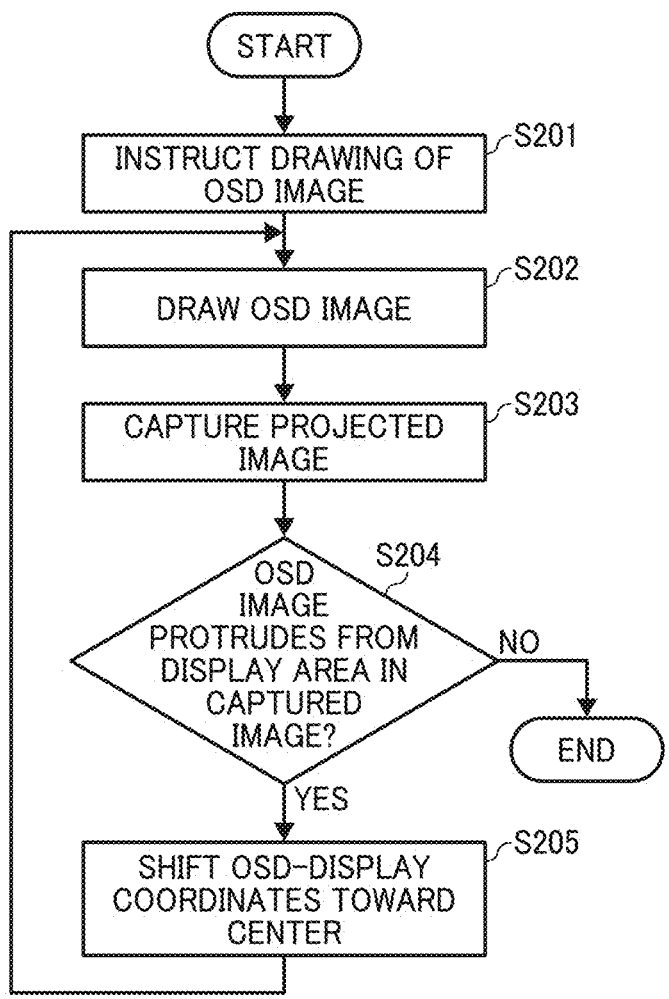
FIG. 13 is a flowchart showing the steps of OSD displaying process (1)

A description is given of an OSD displaying process (1) executable by the image projection apparatus 100. FIG. 13 is a flowchart showing the steps of OSD displaying process (1) by the image projection apparatus 100.

Upon receiving an instruction of drawing the OSD image 104 (S201), the OSD image 104 is drawn (S202), in which a projection image may be already corrected. At S202, the OSD image is displayed at a pre-set position with or without performing the image correction process. As to the above described processing shown in FIG. 4, coordinates of the display area 103 is used for calculating the coordinates (x, y) of the OSD image 104 at S102. By contrast, at S202, coordinates of the entire area 102 is used for calculating the coordinates (x, y) of the OSD image 104, in which the OSD image 104 may or may not be displayed outside the display area 103.

Then, the image capturing unit 140 captures the projection image superimposed with the OSD image 104 and projected on the projection face (S203). Further, it is determined whether the OSD image 104 protrudes from the display area 103 based on the image captured by the image capturing unit 140 (S204). Specifically, by using image recognition methods, it is determined whether the OSD image 104 is within the entire area 102 of the captured image and protrudes at a position corresponding to a black projection area not used as the display area 103. The image recognition methods can employ known or new methods as required.

If the OSD image 104 does not protrude into the black projection area (S204: NO), the OSD image 104 is projected within the display area 103, and the sequence ends.

By contrast, if the OSD image 104 protrudes into the black projection area (S204: YES), the OSD-display coordinates are shifted toward the center of the entire area 102 for some pixels (S205). For example, the OSD-display coordinates are shifted for 10 pixels into the "x" direction, and 10 pixels into the "y" direction.

After S205, the sequence returns to S202 again, and the OSD image 104 is drawn again. Then, the sequence is repeated until the OSD image 104 can be displayed within the display area 103 (S204: NO).

Figure 14:
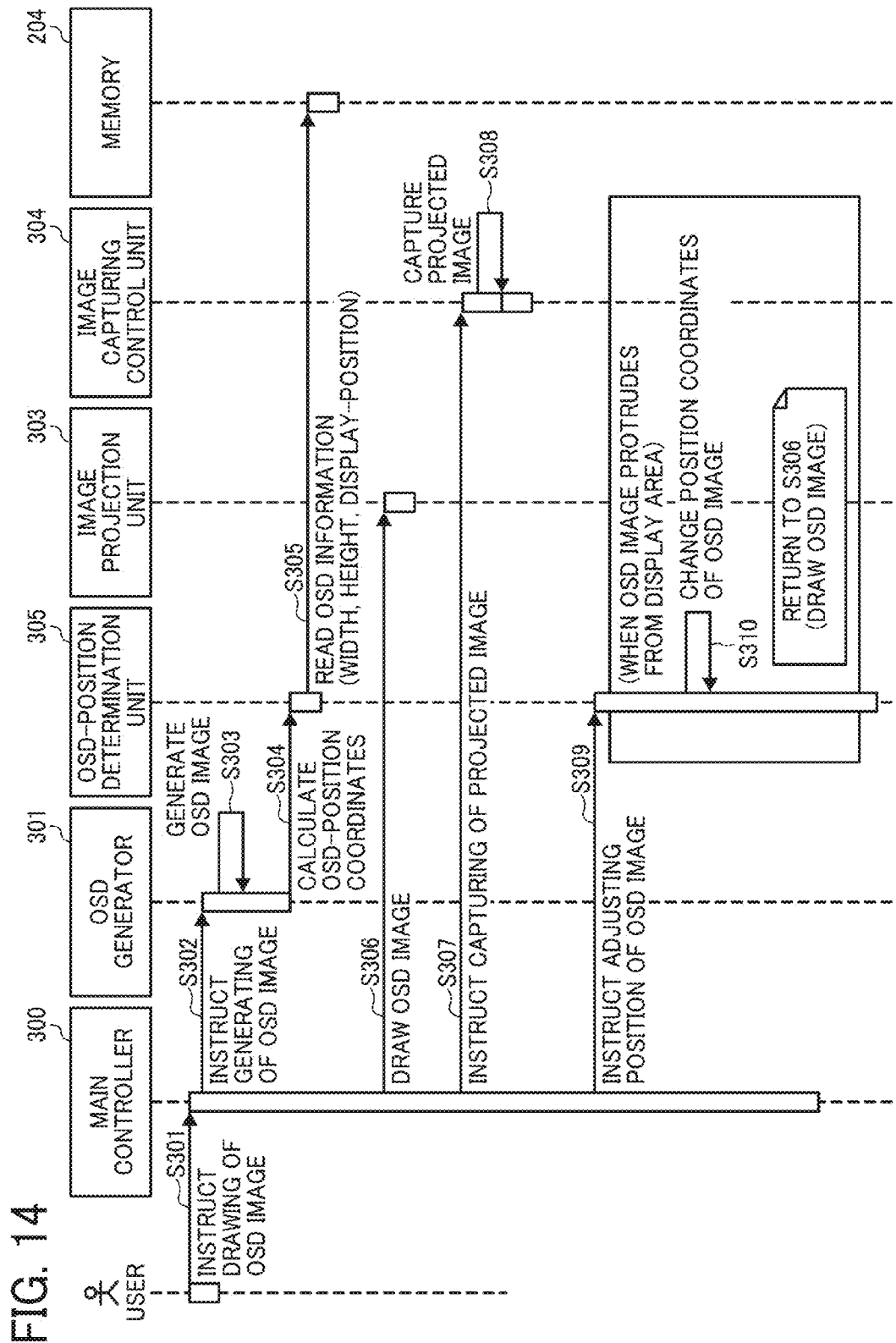
FIG. 14 is an example of a sequential chart of the OSD displaying process (1)

FIG. 14 is an example of a sequential chart of the OSD displaying process (1) executable by the image projection apparatus 100.

When a user instructs a display of the OSD image 104 (instruction of drawing the OSD image 104) from the operation unit 226 or the remote controller 235, the instruction of drawing the OSD image 104 is transmitted to the main controller 300 via the operation control unit 302 (S301).

Then, the main controller 300 transmits the instruction of generating the OSD image 104 to the OSD generator 301 (S302), and the OSD generator 301 generates the OSD image 104 (S303).

Then, the OSD generator 301 instructs the OSD-position determination unit 305 to calculate coordinates of a display position of the OSD image 104 (S304). Then, the OSD-position determination unit 305 reads OSD information (e.g., width, height, display position pattern) from the memory 204, and calculates the coordinates of the display position of the OSD image 104 based on the read OSD information (S305).

Then, based on the calculated coordinates of the display position of the OSD image 104, the main controller 300 instructs the image projection unit 303 to draw the OSD image 104 (S306).

Then, the main controller 300 instructs the image capturing control unit 304 to capture an image projected on the projection face (S307). The image capturing control unit 304 controls the image capturing unit 140 to capture the projected image (S308).

Then, the main controller 300 instructs the OSD-position determination unit 305 to adjust the position of the OSD image 104 (S309). The OSD-position determination unit 305 determines whether the OSD image 104 protrudes from the display area 103. If the OSD image 104 protrudes from the display area 103, coordinates of the display position of the OSD image 104 are changed or shifted (S310). Then, the sequence returns to S306.

OSD Displaying Process (2)

Figure 15:
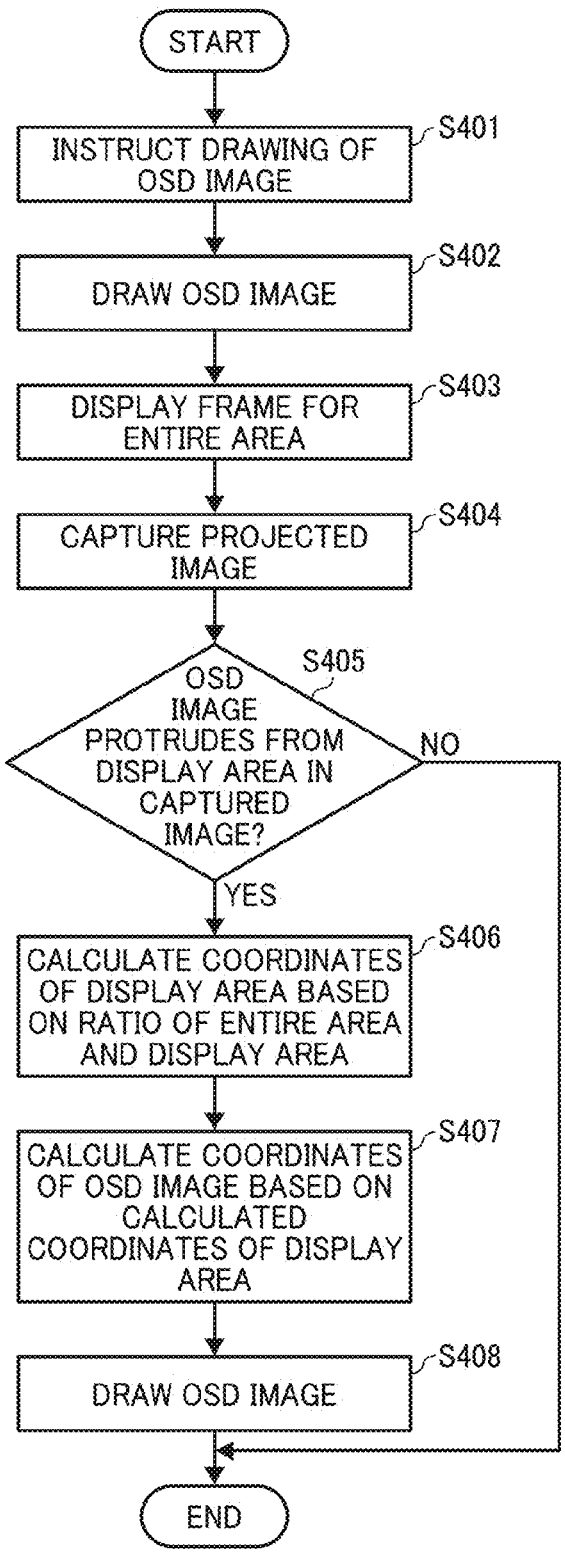
FIG. 15 is a flowchart showing the steps of OSD displaying process (2)

FIG. 15 is a flowchart showing the steps of an OSD displaying process (2) executable by the image projection apparatus 100. In this OSD displaying process (2), a frame is displayed at a periphery of the entire area 102 when conducting the image capturing and changing a display position of the OSD image 104.

Figure 16:
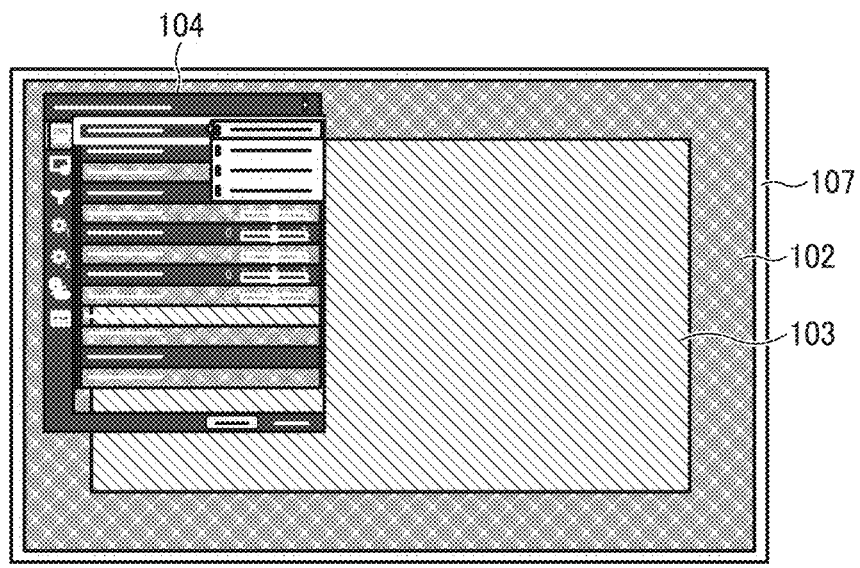
FIG. 16 is an example of a frame displayed at a periphery of an entire area.

Upon receiving the instruction of drawing the OSD image 104 (S401), the OSD image 104 is drawn (S402). Then, as illustrated in FIG. 16, a frame 107 is displayed at a periphery of the entire area 102 such as at a periphery of a projection image (S403). With this configuration, a boundary between the entire area 102 and the projection face 150 can be identified clearly. The frame 107 is displayed, for example, with a width of several pixels.

Then, the image capturing unit 140 captures the image projected on the projection face 150 (S404). Then, it is determined whether the OSD image 104 protrudes from the display area 103 in the captured image (S405).

If the OSD image 104 does not protrude from the display area 103 (S405: NO), the sequence ends.

By contrast, if the OSD image 104 protrudes from the display area 103 (S405: YES), coordinates of the display area 103 is calculated based on a ratio of the display area 103 and the entire area 102 in the captured image (S406).

At S406, the ratio of the display area 103 and the entire area 102 in the captured image is calculated, and also coordinates of the display area 103 are calculated based on the pixel numbers of the entire area 102, which is known information.

Figure 17:
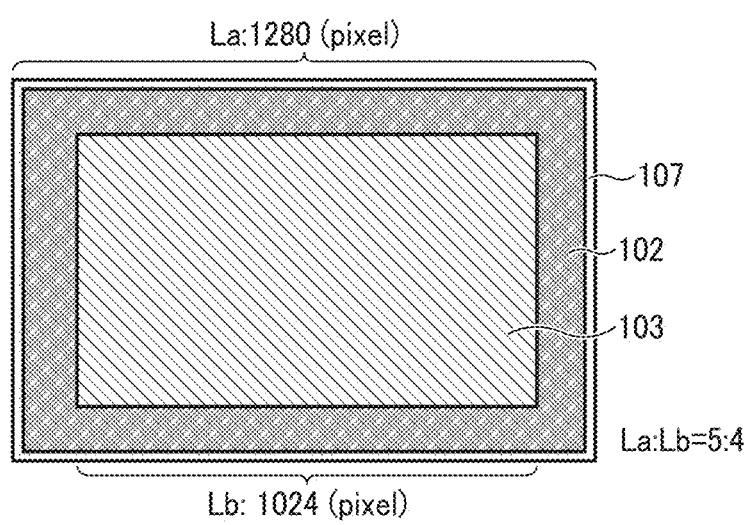
FIG. 17 is an example of an entire area and a display area having a given width ratio.

For example, as illustrated in FIG. 17, if a ratio of a width of the entire area 102 including the frame 107 ("La" in FIG. 17), and a width of the display area 103 ("Lb" in FIG. 17) is five to four (5:4), the width of the display area 103 can be calculated as below based on the pixel numbers of the entire area 102 having, for example, a size of 1280×800 pixels.

Width of display area=1280×⅘=1024 (pixels)

Then, the upper-left corner coordinate (x) of the display area 103 can be calculated as below.

Upper-left corner coordinate (x) of display area=(1280−1024)/2=128

Then, the coordinates of display position of OSD image 104 can be calculated using the calculated coordinates of the display area 103 (S407), and the OSD image 104 is drawn within the display area 103 (S408). If the display area 103 has an irregular shape, the coordinates of the display area 103 may not be correctly calculated by the above described OSD displaying process (2), but can be calculated by the OSD displaying process (1).

OSD Displaying Process (3)

Figure 18:
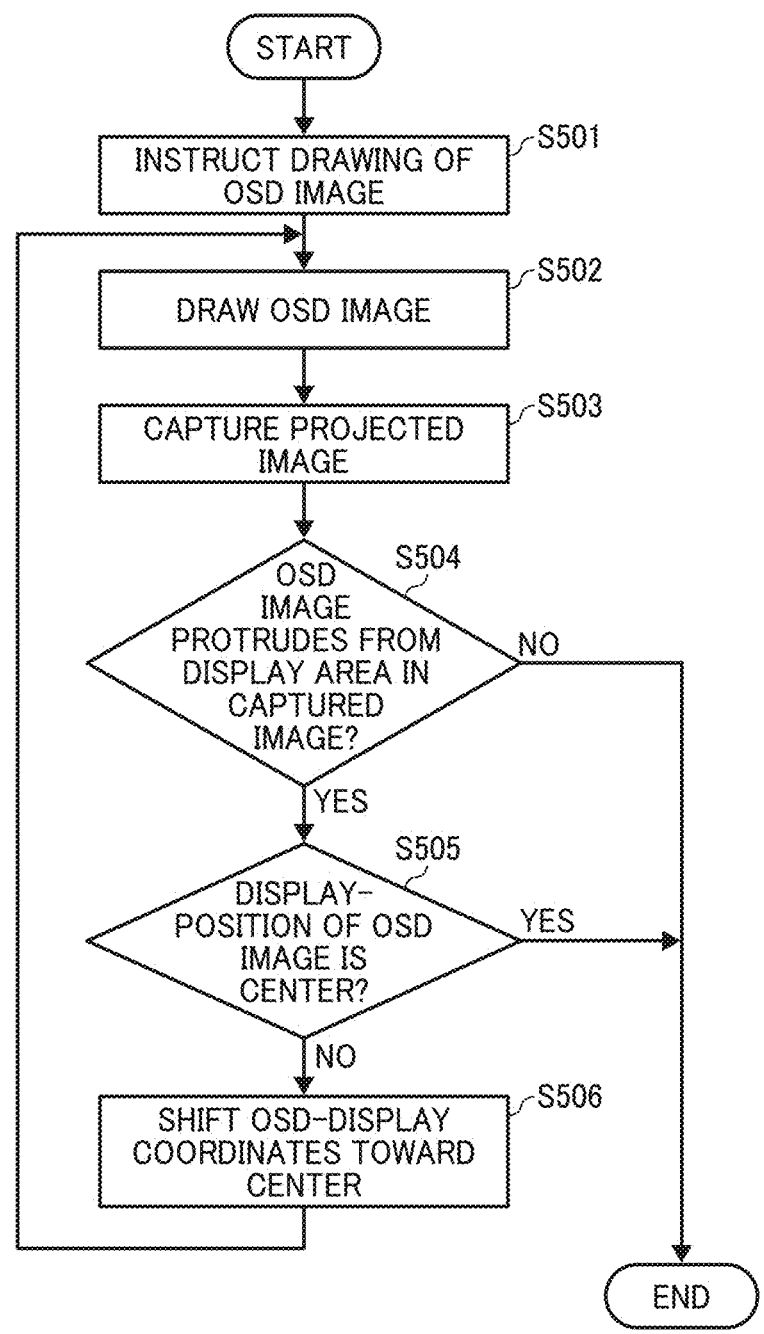
FIG. 18 is a flowchart showing the steps of OSD displaying process (2)

FIG. 18 is a flowchart showing the steps of an OSD displaying process (3) executable by the image projection apparatus 100. In this OSD displaying process (3), a display position of the OSD image may not be shifted depending on a display position pattern applied to the OSD image 104 to set a faster processing speed.

Upon receiving the instruction of drawing the OSD image 104 (S501), the OSD image 104 is drawn (S502).

Then, the image capturing unit 140 captures an image projected on the projection face 150 (S503). Then, it is determined whether the OSD image 104 protrudes from the display area 103 in the captured image captured by the image capturing unit 140 (S504).

If the OSD image 104 does not protrude from the display area 103 (S504: NO), the sequence ends.

By contrast, if the OSD image 104 protrudes from the display area 103 (S504: YES), the display position pattern of the OSD image 104 (see FIG. 6) is determined (S505).

Figure 19:
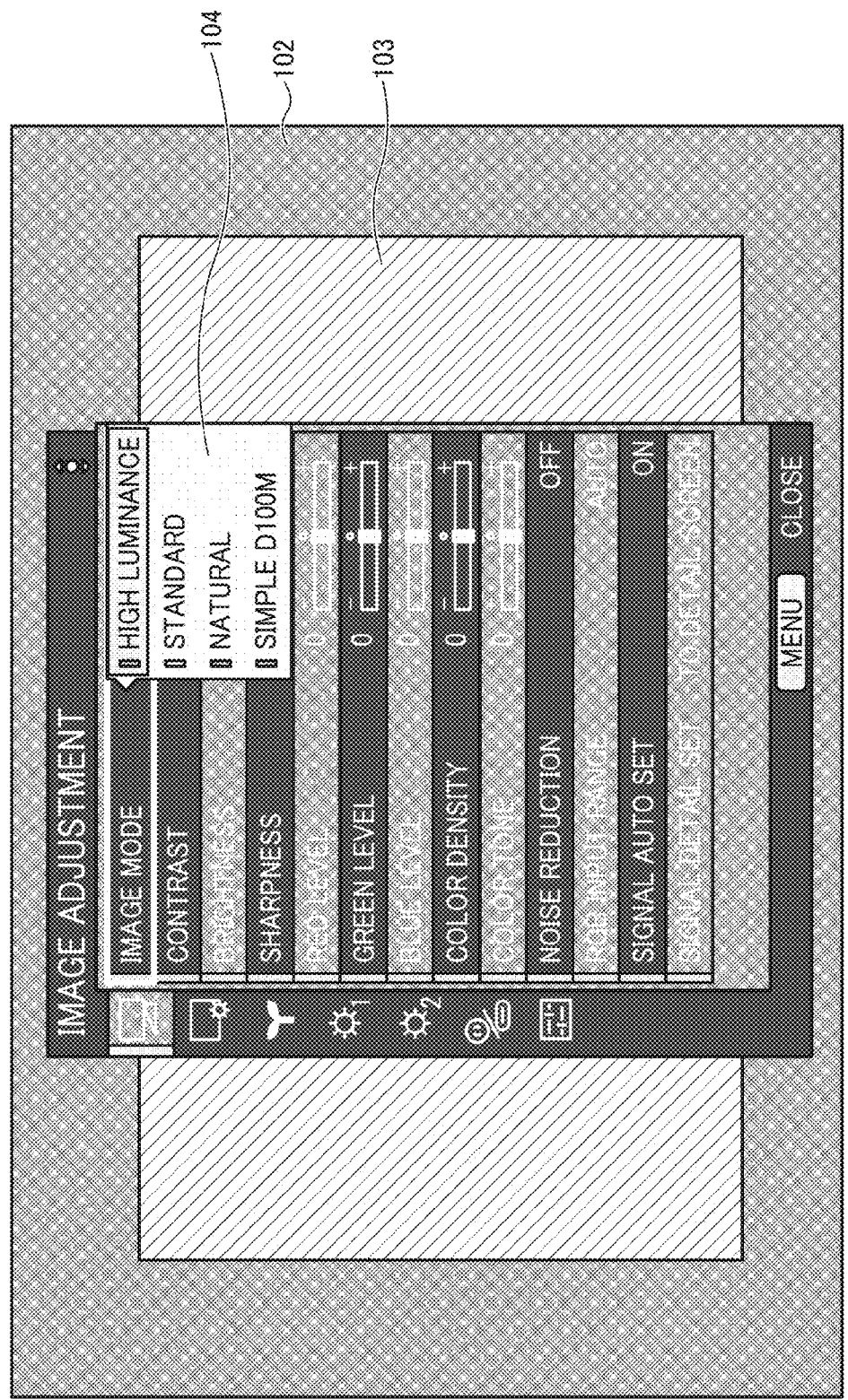
FIG. 19 is an example of OSD image applying a display position pattern of "CENTER" and protruding from a display area.
Figure 21A:
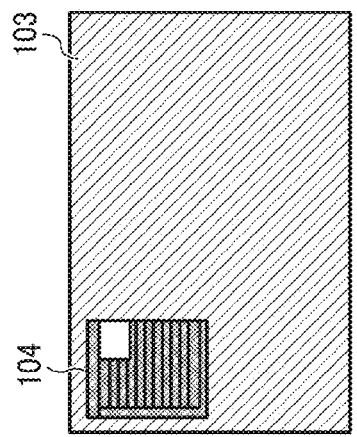
FIGS. 21A, 21B, and 21C are examples of display positions of OSD image when an image correction process is performed by conventional image projection apparatuses.
Figure 21B:
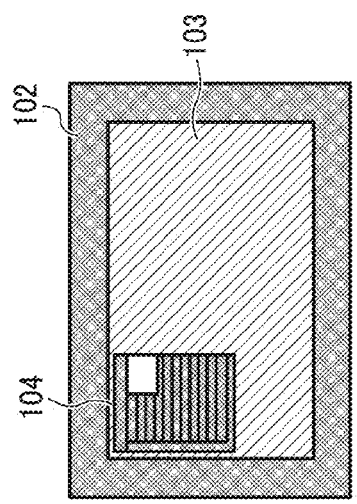
Figure 21C:
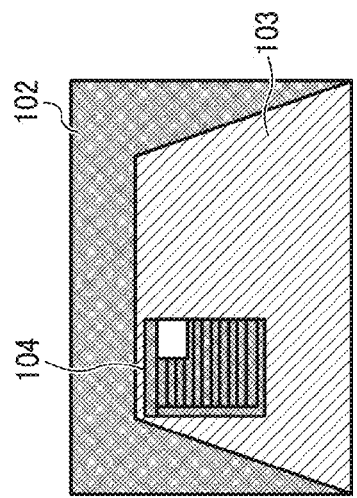

If the display position pattern of the OSD image 104 is "CENTER" (S505: YES), the sequence ends. Specifically, if the display position pattern of the OSD image 104 is "CENTER" and the OSD image 104 protrudes from the display area 103 as illustrated in FIG. 19, the OSD image 104 cannot be fit within the display area 103 even if the position of the OSD image 104 is shifted or moved. Therefore, the sequence ends without shifting the position of the OSD image 104.

By contrast, if the display position pattern of the OSD image 104 is not "CENTER" (S505: NO), the OSD-display coordinates are shifted toward the CENTER of the entire area 102 for some pixels (S506). For example, the OSD-display coordinates are shifted for 10 pixels into the "x" direction, and 10 pixels into the "y" direction.

After S506, the sequence returns to S52 again, and the OSD image 104 is drawn again. Then, the sequence is repeated until the OSD image 104 can be displayed within the display area 103 (S54: NO).

As to the above described image projection apparatuses, it is determined whether the OSD image can be fit within the display area of the corrected projection image by referring the captured projection image, and if the OSD image is not fit within the display area, the display position of the OSD image is shifted. Therefore, the OSD image can be displayed within the display area of the corrected projection image when any types of the image correction methods such as barrel correction and others are performed.

Further, the above described units 300 to 305 of the system controller 201 can be implemented by executing one or more software programs by the CPU of the image projection apparatus 100.

The present invention can be implemented in any convenient form, for example using dedicated hardware platform, or a mixture of dedicated hardware platform and software. Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions. The illustrated server apparatuses are only illustrative of one of several computing environments for implementing the embodiments disclosed herein. For example, in some embodiments, any one of the information processing apparatus may include a plurality of computing devices, e.g., a server cluster, that are configured to communicate with each other over any type of communication links, including a network, a shared memory, etc. to collectively perform the processes disclosed herein.

The computer software can be provided to the programmable device using any storage medium or carrier medium such as non-volatile memory for storing processor-readable code such as a floppy disk, a flexible disk, a compact disk read only memory (CD-ROM), a compact disk rewritable (CD-RW), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a flash memory, Blu-ray disc (registered trademark), SD card, a solid state memory device or the like, but not limited these. Further, the computer software can be provided through communication lines such as electrical communication line. Further, the computer software can be provided in a read only memory (ROM) disposed for the computer. The computer software stored in the storage medium can be installed to the computer and executed to implement the above described processing. The computer software stored in the storage medium or apparatus of an external apparatus can be downloaded and installed to the computer via a network to implement the above described processing.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C, C++, C#, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image projection apparatus for generating a projection image based on image data input to the image projection apparatus and projecting the projection image onto a projection face, the image projection apparatus comprising:
   a correction unit to correct the projection image;
   a synthesis image projection unit to superimpose a superimposition image on the projection image corrected by the correction unit to generate a synthesis image and project the synthesis image onto the projection face; and
   an image capturing unit to capture the synthesis image projected on the projection face,
   wherein the synthesis image projection unit changes a display position of the superimposition image to fit the superimposition image within a display area of the synthesis image by referring an image of the synthesis image captured by the image capturing unit, and projects the synthesis image after changing the display position of the superimposition image.

2. The image projection apparatus of claim 1, wherein the correction unit corrects the projection image when a distortion occurs to the projection image.

3. The image projection apparatus of claim 1, wherein the synthesis image projection unit displays a frame at a periphery of the synthesis image.

4. The image projection apparatus of claim 1, wherein the display position of the superimposition image in the projection image is stored as pre-set display position patterns for setting the display position of superimposition image at a plurality of positions in the projection image,
   wherein the synthesis image projection unit does not change the display position of the superimposition image when the superimposition image is displayed in the synthesis image by applying a given display position pattern selected from the pre-set display position patterns.

5. The image projection apparatus of claim 4, wherein the synthesis image projection unit does not change display position of the superimposition image when the given display position pattern applied to the superimposition image is the center of the display area of the synthesis image.

6. A method of projecting an image by generating a projection image based on image data input to an image projection apparatus and projecting the projection image onto a projection face by the image projection apparatus, the method comprising the steps of:
   correcting the projection image when a distortion occurs to the projection image;
   superimposing a superimposition image on the projection image corrected at the correcting step to generate a synthesis image;
   projecting the synthesis image on the projection face;
   capturing the synthesis image projected on the projection face;
   changing a display position of the superimposition image to fit the superimposition image within a display area of the synthesis image by referring an image of the synthesis image captured at the capturing step, and
   projecting the synthesis image at the display position changed at the changing step.

7. A non-transitory storage medium storing a program that, when executed by a computer, causes the computer to execute a method of projecting an image by generating a projection image based on image data input to an image projection apparatus and projecting the projection image onto a projection face by the image projection apparatus, the method comprising the steps of:

correcting the projection image when a distortion occurs to the projection image;

superimposing a superimposition image on the projection image corrected at the correcting step to generate a synthesis image;

projecting the synthesis image on the projection face;

capturing the synthesis image projected on the projection face;

changing a display position of the superimposition image to fit the superimposition image within a display area of the synthesis image by referring an image of the synthesis image captured at the capturing step, and projecting the synthesis image at the display position changed at the changing step.

* * * * *